United States Patent
Tondreau, Jr. et al.

(10) Patent No.: US 8,843,909 B2
(45) Date of Patent: Sep. 23, 2014

(54) METHOD AND APPARATUS FOR TRANSFORMING LEGACY SOFTWARE APPLICATIONS INTO MODERN OBJECT-ORIENTED DISTRIBUTED SYSTEMS

(75) Inventors: David L. Tondreau, Jr., Vienna, VA (US); John P. Mahony, Sterling, VA (US)

(73) Assignee: CA, Inc., Islandia, NY (US)

( * ) Notice: Subject to any disclaimer, the term of this patent is extended or adjusted under 35 U.S.C. 154(b) by 2153 days.

(21) Appl. No.: 10/887,538

(22) Filed: Jul. 8, 2004

(65) Prior Publication Data
US 2005/0039173 A1   Feb. 17, 2005

Related U.S. Application Data

(63) Continuation-in-part of application No. 10/341,132, filed on Jan. 13, 2003, now Pat. No. 7,467,375, which is a continuation of application No. 10/142,462, filed on May 10, 2002, now abandoned.

(60) Provisional application No. 60/486,651, filed on Jul. 11, 2003, provisional application No. 60/290,203, filed on May 11, 2001.

(51) Int. Cl.
*G06F 9/45*     (2006.01)
*G06F 9/44*     (2006.01)
*G06F 9/46*     (2006.01)

(52) U.S. Cl.
CPC *G06F 8/45* (2013.01); *G06F 9/465* (2013.01); *G06F 8/51* (2013.01)
USPC ........... 717/149; 717/103; 717/106; 717/120; 717/130

(58) Field of Classification Search
CPC ............... G06F 8/20; G06F 8/30; G06F 8/71; G06F 8/45; G06F 8/51; G06F 8/456; G06F 11/3466
See application file for complete search history.

(56) References Cited

U.S. PATENT DOCUMENTS

| | | | | |
|---|---|---|---|---|
| 5,675,805 A | * | 10/1997 | Boldo et al. | 717/114 |
| 5,960,200 A | * | 9/1999 | Eager et al. | 717/147 |
| 6,072,953 A | * | 6/2000 | Cohen et al. | 717/166 |
| 6,523,171 B1 | * | 2/2003 | Dupuy et al. | 717/136 |
| 7,103,879 B2 | * | 9/2006 | Ruellan et al. | 717/130 |
| 7,137,109 B2 | * | 11/2006 | Shortz | 717/149 |

(Continued)

FOREIGN PATENT DOCUMENTS

WO   WO 95/18409   7/1995 ............... G06F 9/44

OTHER PUBLICATIONS

Kuebler, Dietmar and Wolfgang Eibach, "Adapting legacy applications as Web services," IBM: Jan. 1, 2002, pp. 1-7, accessed from <http://www.ibm.com/developerworks/webservices/library/ws-legacy/>.*

(Continued)

*Primary Examiner* — Thuy Dao
(74) *Attorney, Agent, or Firm* — Baker Botts, LLP

(57) ABSTRACT

A method for transforming a procedural program having procedural language code into an object-oriented distributed software program is provided. A procedural program is transformed into intermediate client-server code. The intermediate client-server code is partitioned into an N-tier application program.

20 Claims, 13 Drawing Sheets

(56) References Cited

U.S. PATENT DOCUMENTS

| | | | |
|---|---|---|---|
| 7,243,345 B2* | 7/2007 | Ohsawa et al. | 717/149 |
| 7,246,345 B1* | 7/2007 | Sharma et al. | 717/120 |
| 7,610,575 B2* | 10/2009 | Sproule | 717/103 |
| 2002/0116454 A1* | 8/2002 | Dyla et al. | 709/203 |
| 2002/0178290 A1* | 11/2002 | Coulthard et al. | 709/246 |
| 2004/0064804 A1* | 4/2004 | Daniels et al. | 717/106 |

OTHER PUBLICATIONS

Hyperion Solutions Corp., N-Tier Application Programming Interface Guide, 2006, 12 pages.*

Summons to attend oral proceedings pursuant to Rule 115(1) EPC issued by the European Patent Office; Reference HCD/KT/J45963EP; Application No./Patent No. 02734373.0-221/1388054.

Masiero, P.C. et al.: "Legacy systems reengineering using software patterns" Computer Science Society, 1999. Proceedings. SCCC '99. XIX International Conference of the Chilean Talca, Chile 11-33 Nov. 1999, Los Alamitos, CA, USA, IEEE Comput. Soc, US, Nov. 11, 1999, pp. 160-169, XP010365295 ISBN: 0-7695-0296-2.

Gonzales, N.A. et al.: "Migrating software from procedural object-oriented architecture" Systems, Man, and Cybernetics, 1998. 1998 IEEE International Conference on San Diego, CA, USA Oct. 11-14, 1998, New York, NY, USA, IEEE, US, Oct. 11, 1998, pp. 4872-4877, XP010311248 ISBN: 0-7803-4778-1.

Sneed, H.M.: "Reverse engineering as a bridge to CASE" Computer-Aided Software Engineering, 1995. Proceedings., Seventh International Workshop on Toronto, Ont., Canada Jul. 10-14, 1995, Los Alamitos, CA, USA, IEEE Comput. Soc, US, Jul. 10, 1995, pp. 304-317, XP010146616 ISBN: 0-8186-7078-9.

Jacobson, I. et al.: "Re-engineering of old systems to an object-oriented architecture" OOPSLA '91. Object-Oriented Programming Systems, Languages, and Applications, Phoenix, AZ, USA, Oct. 6-11, 1991, vol. 26, No. 11, pp. 340-350, XP002213902 SIGPLAN Notices, Nov. 1991, USA ISSN: 0362-1340.

Sneed, H.M.: "Migration of procedurally oriented COBOL programs in an object-oriented architecture" Software Maintenance, 1992. Proceedings., Conference on Orlando, FL, USA Nov. 9-12, 1992, Los Alamitos, CA, USA, IEEE Comput. Soc, US Nov. 9, 1992, pp. 105-116, XP010030542 ISBN: 0-8186-2980-0.

* cited by examiner

Frame Transformation

| | | |
|---|---|---|
| VIFRED Form | → | Frame + Frame Script |
| OSL Source | → | BusinessObject Class |
|     Initialization Block | |     Start() method |
|     Field Events | |     ValidateFieldName() method(s) |
|     Menu Items | |     MenuLabel() method(s) |
|     Local Procedures | |     ProcedureName() method(s) |
| Frame Return Value | → | BusinessObject "ObjectValue" attribute |
| Form Name | → | BusinessObject "ObjectGUI" default value |
| Form Fields | → | Attributes and Invoke() parameters |
| Frame Parameters | → | Attributes and Invoke() parameters |
| Frame Global Variables | → | Attributes |

FIG. 12B

Other Components

| | | |
|---|---|---|
| 4GL Procedure | → | BusinessObject Class |
|     Main Procedure | |     Start() method |
|     Local Procedures | |     ProcedureName() method(s) |
|     Return Value | |     "ObjectValue" attribute |
|     Parameters | |     Attributes and Invoke() parameters |
|     Global Variables | |     Attributes |
| 3GL Procedure | → | 3GL Procedure + "Cover" BusinessObject |
| Constant | → | Constant |
| Global | → | Global |
| Record Type | → | Methodless User Class |

FIG. 13
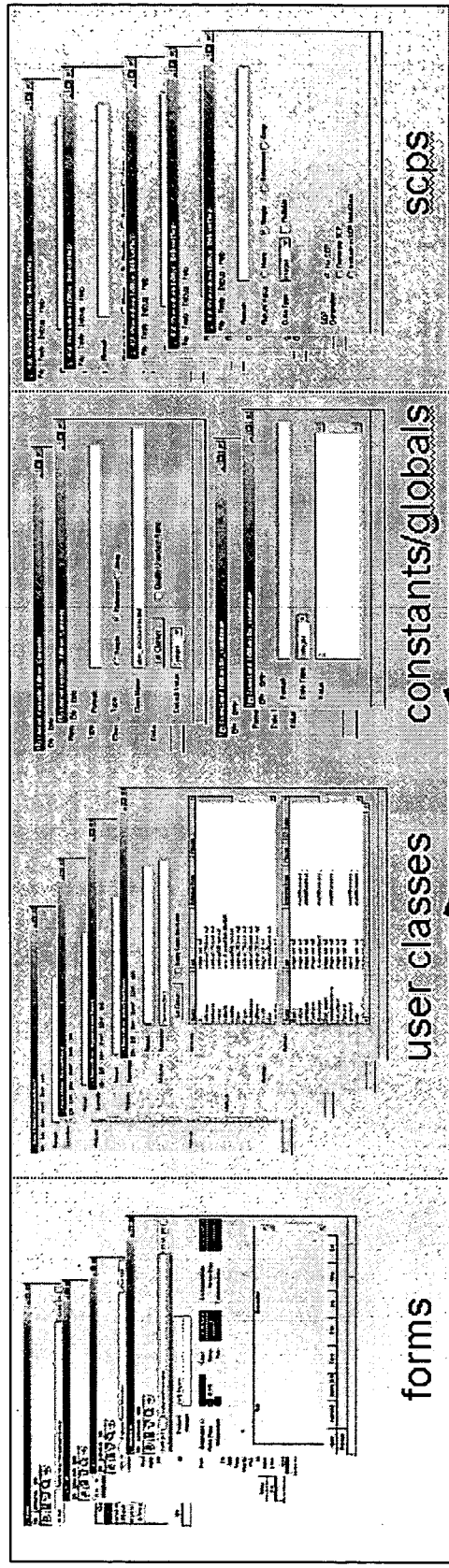
*Application Source (and Fat Client Image)*
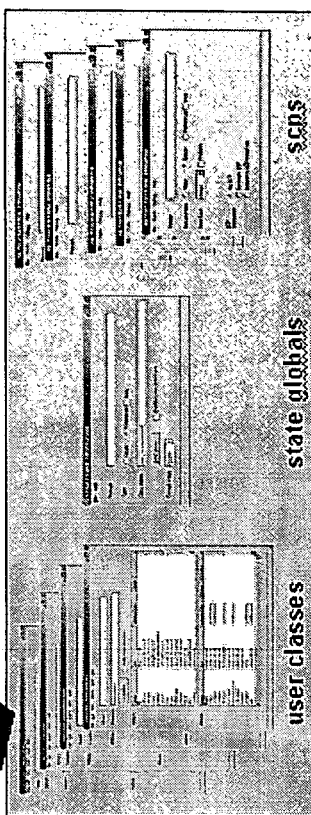
*Application Server Image*
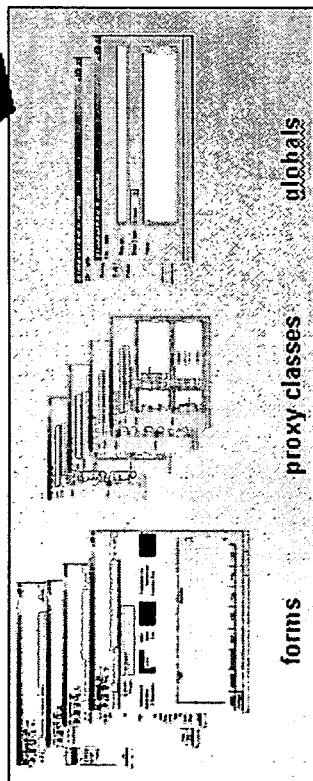
*Thin Client Image*

METHOD AND APPARATUS FOR TRANSFORMING LEGACY SOFTWARE APPLICATIONS INTO MODERN OBJECT-ORIENTED DISTRIBUTED SYSTEMS

CROSS-REFERENCE TO RELATED APPLICATIONS

This application claims the benefit of U.S. provisional application Ser. No. 60/486,651, filed Jul. 11, 2003, and is a continuation-in-part of U.S. application Ser. No. 10/341,132, filed Jan. 13, 2003, now U.S. Pat. No. 7,467,375 which is a Rule 1.53(b) continuation of U.S. application Ser. No. 10/142,462, filed May 10, 2002, now abandoned which claims the benefit of U.S. provisional application Ser. No. 60/290,203, filed May 11, 2001.

TECHNICAL FIELD

The present disclosure relates to transformation of computer programs. More specifically, the present disclosure relates to transformation of legacy software applications into object-oriented distributed software systems.

DESCRIPTION OF THE RELATED ART

Many technologies and methodologies exist for converting software applications from one programming language to another. But the language in which a software application is written is only one aspect of its makeup. A software application is a complex system having many parts.

Code is a portion of a software application that is written in a programming language and represents the instructions that the software application executes. In the early days of computers, software applications were written using assembly language (second generation language—2GL). An assembly language program is converted by an application called an "assembler" into machine language (first generation language—1 GL) code which is executed by the central processing unit of a computer. Assembly language operations are very low level and can make writing applications difficult. As computer technology evolved, alternative higher-level languages (third generation language—3GL) were developed which allowed the programmer to more easily create software for performing complex tasks. A special software application called a "compiler" was developed for converting higher level language programs to machine language code which can be executed by the computer. Higher level languages allow code to be organized into blocks of code called routines or procedures, which can be used repeatedly, if necessary.

Software applications also need to be able to manage information. Software development tools typically provide the capability for declaring data structures. Data structures allow data to be organized in an identifiable fashion so that the data can readily be referenced by software code. The code contains instructions for acting on the data structures and is grouped in segments called routines. In early software development tools, data structures and routines were defined separately. In order for any routine to operate on data, the data had to be passed to the routine as a parameter. The approach of writing software that calls routines and passes parameters is commonly referred to as "procedural programming." A more modern approach is the object oriented (or OO) model. The OO model is dramatically different from the procedural model.

In the OO model, data structures and code routines may be grouped into a single, independent data structure called a "class." A class is a template definition of the routines, called "methods", and data structures belonging to a particular kind of object. The class defines the common properties of the member objects. OO programs may be easily created and modified due to the modular, reusable code structure.

OO programming also allows for many other advantageous characteristics such as inheritance. Inheritance allows users to create a new object first by specifying another object as its parent class (also referred to as "super class"). The newly created object immediately acquires all of the capabilities of its parent. However, users can customize the new class's behavior under any circumstance.

A user interface is a portion of the application that allows an individual to interact with the software application. In many cases, the user interface is created using forms (fourth generation language—4GL). A form specifies the appearance of the fields and trim that are presented to the user on a display. Fields are individual areas where a user can enter data. Trim is fixed information such as labels, which instruct the user what to enter in different fields or provide some other purpose in the application. Often these forms are not implemented using code. Rather, there is a forms editor which is part of a software development environment that allows a programmer to interactively build the forms. The definition of the form is stored in a repository and the development environment provides for the display of the forms when the application is executed.

Software development tools of the 1970s and 1980s used a character-based user interface. Typically, this user interface was restricted to displaying a form of 80 characters per line by 24 lines. These tools often used a $25^{th}$ line on a terminal to display the commands associated with the active form. More modem tools allow the implementation of forms which use a graphical user interface (GUI). The GUI allows for the implementation of more complex forms with a greater number and variety of user controls.

Together, the code and the forms create an application that can be executed to perform a task. The portion of the program that manages the user interface is called "presentation logic." This includes the code statements that trap user input and start program actions, prompt the user for additional information or otherwise make changes to the display. The remainder of the code is called "business logic." The business logic includes the workflows, database access, transactions and other actions that are a consequence of the user's commands. It is quite common for business logic and presentation logic to be intertwined.

A database management system (DBMS) is a collection of programs that can store, modify, and extract information from a database. Requests for information from a database are made in the form of a query, which is a stylized question. The set of rules for constructing queries is known as a query language. Different DBMSs support different query languages, although there is a semi-standardized query language called "SQL" (structured query language).

The information stored in a database can be presented in a variety of formats. Most DBMSs include a report writer program that enables data to be output in the form of a report. The report writer program, also called a "report generator", is a part of a database management system that extracts information from one or more files and presents the information in a specified format. Report writers allow selection of records that meet certain conditions and display selected fields in rows and columns. Data may be formatted into pie charts, bar charts, and other diagrams. Once a report format is created, the format specifications may be saved in a file and reused for future presentations.

Relational database management systems (RDBMS) are a type of database management system (DBMS) that stores data in the form of related tables. Relational databases embody assumptions about how data is related or how it is to be extracted from the database. As a result, the same database may be viewed in many different ways. In relational database management systems, information is stored in the form of tables, for example, a spreadsheet, which refer to data arranged in rows and columns. One desirable feature of relational systems is that a single database can be spread across several tables.

A software application is implemented using some kind of architecture. The architecture describes the basic infrastructure of the application. One aspect of architecture relates to the number of computers that are involved. A single-tier software application is one in which all of the applications and/or systems run on a single computer, including any external calls the software may make to other software applications. For instance, a software application may call a database management system in order to retrieve or update data. In the single-tier model, both the software application and the database management system run on a single computer. The user interface may be displayed on a dumb terminal which is a device capable only of displaying a form, allowing the user to enter information, and returning that input to the host computer.

A client/server application, or two-tiered software application, is one in which the software application is running on one computer (the client) and makes external calls to other software applications running on another computer (the server) via a network connection.

An even more recent architectural innovation is the N-tiered application. In the N-tiered model, only part of the software application is run on the client workstation. This is usually an intelligent user interface (or thin client). When a specific task is to be performed, the client locates an application server containing the business logic and the work is actually performed on the computer running the application server. The application server may, in turn, contact another computer, such as a database server, in order to complete the processing requested by this client. As this chain of events can ultimately involve an unlimited number of computers, the model is called an "N-tiered" model.

One challenge facing many enterprises (and other organizations) today is that they have invested large sums of money and time developing software applications which use character interfaces, are procedural in nature and are implemented in a single-tier model. These applications are commonly called "legacy" applications. Supporting and enhancing these applications is a major challenge because developers are no longer being taught the technologies in which they were created. In addition, systems in the current world of the Internet and e-commerce exploit graphical user interfaces, are object-oriented in nature and are implemented using a N-tier model. No technologies have yet been created which allow an enterprise to transform their existing legacy applications into modern, object-oriented, N-tier applications that use a graphical user interface. As a result, the enterprise typically undertakes a time consuming and expensive process to completely redesign and rewrite the application using modern tools.

SUMMARY

This application provides a method for transforming a procedural program having procedural language code into an object-oriented distributed software system. The method, according to one embodiment, includes transforming a procedural program into intermediate client-server code, and partitioning the intermediate client-server code into an N-tier application program.

BRIEF DESCRIPTION OF THE DRAWINGS

The features of the present application can be more readily understood from the following detailed description with reference to the accompanying drawings wherein:

FIG. 6 shows a sample visualization of an abstract syntax tree expressed as an XML document, according to an exemplary embodiment of the present disclosure;

FIGS. 12A and 12B show examples of separation of user interface from application code; and FIG. 13 shows a schematic representation of building client and server images out of the same source code base.

DETAILED DESCRIPTION

This application provides tools (in the form of methods, apparatuses and systems) for transforming a procedural program having procedural language code into an object-oriented distributed software system. The tools may be embodied in one or more computer programs stored on a computer readable medium and/or transmitted via a computer network or other transmission medium.

In describing some exemplary embodiments, specific terminology is employed herein in order to preserve clarity. However, the present disclosure is not intended to be limited to the specific terminology so selected, and it is to be understood that each specific element includes all technical equivalents which operate in a similar manner.

Figure 1:
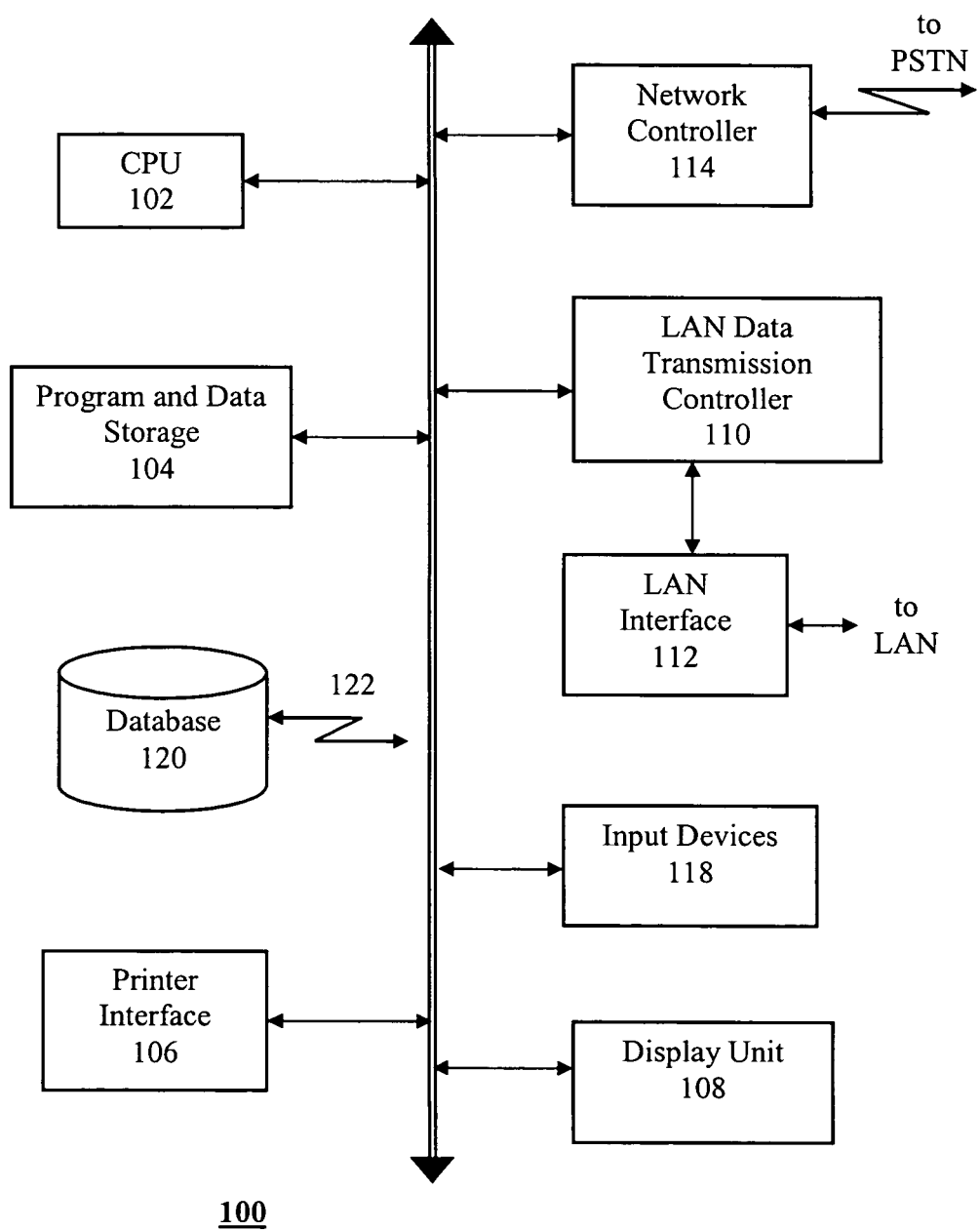
FIG. 1 shows an example of a conventional computer system.

FIG. 1 shows an example of a conventional computer system which can be adapted, along with other similar computers, for implementing the methods, apparatuses and systems of the present disclosure. The tools of the present disclosure may be implemented in the form of a software application running on a computer system (for example, a mainframe, personal computer (PC), handheld computer, server, etc.) for transforming a procedural program having procedural language code into an object-oriented distributed software system. The software application may be stored on a storage media locally accessible by the computer system, for example, floppy disk, compact disk, hard disk, etc., or may be accessed remotely by the computer system, for example, via a wired or wireless network, such as a local area network, a wide area network, the Internet, etc.

The computer system is referred to generally as system 100, and may include a central processing unit (CPU) 102, memory 104, for example, Random Access Memory (RAM), a printer interface 106, a display unit 108, a (LAN) local area network data transmission controller 110, a LAN interface 112, a network controller 114, an internal bus 116 and one or more input devices 118, for example, a keyboard, mouse etc. As shown, the system 100 may be connected to a data storage device, for example, a hard disk, 120, via a link 122.

Figure 7:
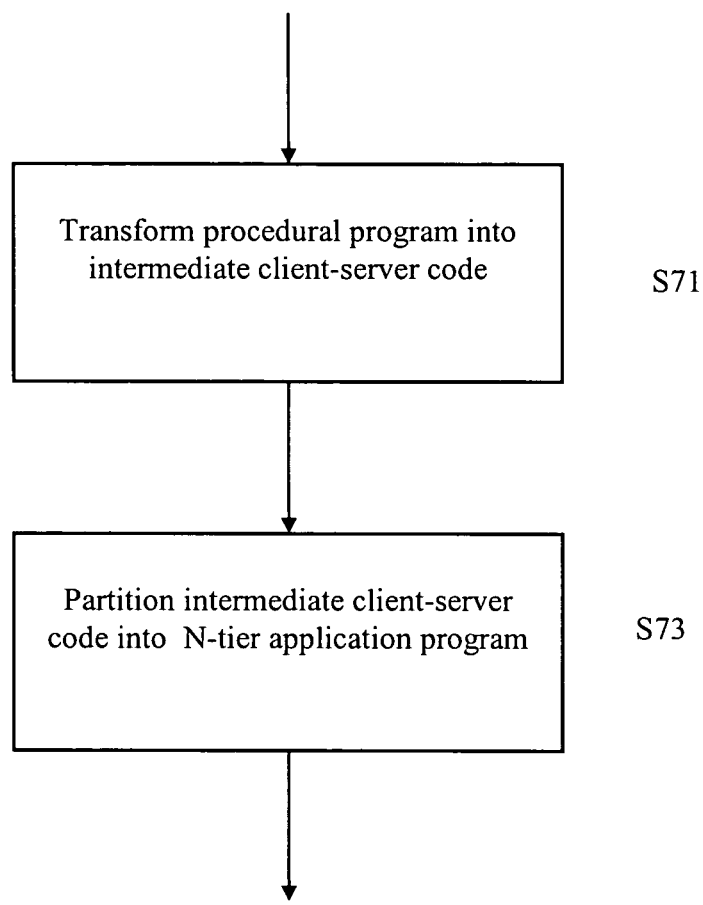
FIG. 7 shows a flow chart of a process, according to an embodiment of the present disclosure, for transforming a procedural program having procedural language code into an object-oriented distributed software system.

A method for transforming a procedural program having procedural language code into an object-oriented distributed software system, according to an exemplary embodiment of this application (FIG. 7) includes transforming a procedural program into intermediate client-server code (step S71), and partitioning the intermediate client-server code into an N-tier application program (step S73).

The N-tier application program preferably includes a thin client and a plurality of server-based components. The thin client may include user interface components, and the server-based components can include business logic components. The business logic components may include web services. The server-based components can include a DBMS server component.

The partitioning of the intermediate client-server code into an N-tier application program can include separating user interface logic from application code logic, adding application state management, separating interface logic from transactional logic and/or implementing a browser-enabled, thin client interface.

The tools of the present disclosure can be applied to perform transformation of legacy software applications into modem, object-oriented, N-tier applications that use a graphical user interface (GUI). The transformation contemplated by the present disclosure includes converting and enhancing the individual aspects of the system. In a single process, the character based user interface of the legacy software application can be transformed into a GUI, the code and data structures are integrated, reconfigured and regenerated as appropriately formed object classes, and enhancements and additions can be made to the legacy software application to enable it to operate as either a client/server or N-tier system. The process may include subprocesses for analyzing the legacy application program code, creating classes and their methods based on the legacy code, as well as creating a graphical user interface based on the legacy code. Under certain circumstances, conversion of some segments of legacy code may not be desirable, in which case the process may transfer the original code or may substitute new code.

Methods for transforming a procedural program having procedural language code into an object-oriented program are described below. A method for transforming a procedural program having procedural language code into an object-oriented program, according to one embodiment, can comprise scanning the procedural language code and creating a map based on the scanned procedural language code, storing the scanned procedural language code as intermediate code, processing at least a segment of the procedural language code using the map, creating a first data structure using the processed segment, modifying the intermediate code based on the first data structure, and generating an object-oriented program having an object class based on the modified intermediate code. In addition, the method may include suspending the processing of a segment of the procedural language code when a predetermined segment of the procedural language code is detected, and modifying an other intermediate code based on the predetermined segment.

The method for transforming a procedural program having procedural language code into an object-oriented program may also include creating a second data structure based on the procedural language and the second data structure may be a hierarchical tree having a node identifying a property of a statement of the procedural programming language. The creation of a first data structure may include locating a node in the second data structure based on the processed segment, traversing the nodes second data structure to a root node, and including the contents of the traversed nodes in the first data structure.

A method for transforming a procedural program having procedural language code into an object-oriented program, according to another embodiment, can include scanning the procedural language code and creating a map based on the scanned procedural language code, storing the map and the scanned procedural language code as metadata in a repository, creating a new set of target metadata containers for transformed representations of each component, processing at least a segment of the procedural language code using procedural metadata representations to create a first abstract syntax tree using the processed segment, populating the target metadata containers based on the first abstract syntax tree and generating an object-oriented metadata representation of the original procedural program having an object class based on the first abstract syntax tree. In addition, the method may further include suspending the step of processing a segment of the procedural language code when a predetermined segment of the procedural language code is detected and modifying another abstract syntax tree based on the predetermined segment.

The method for transforming a procedural program having procedural language code into an object-oriented program may also comprise creating a second abstract syntax tree based on the procedural language, wherein the second abstract syntax tree may be an abstract syntax tree having a node identifying a property of a statement of the procedural programming language. The step of creating the first abstract syntax tree may include locating a node in the second abstract syntax tree based on the processed segment, traversing the nodes second abstract syntax tree to a root node, and including the contents of the traversed nodes in the first abstract syntax tree.

Figure 2:
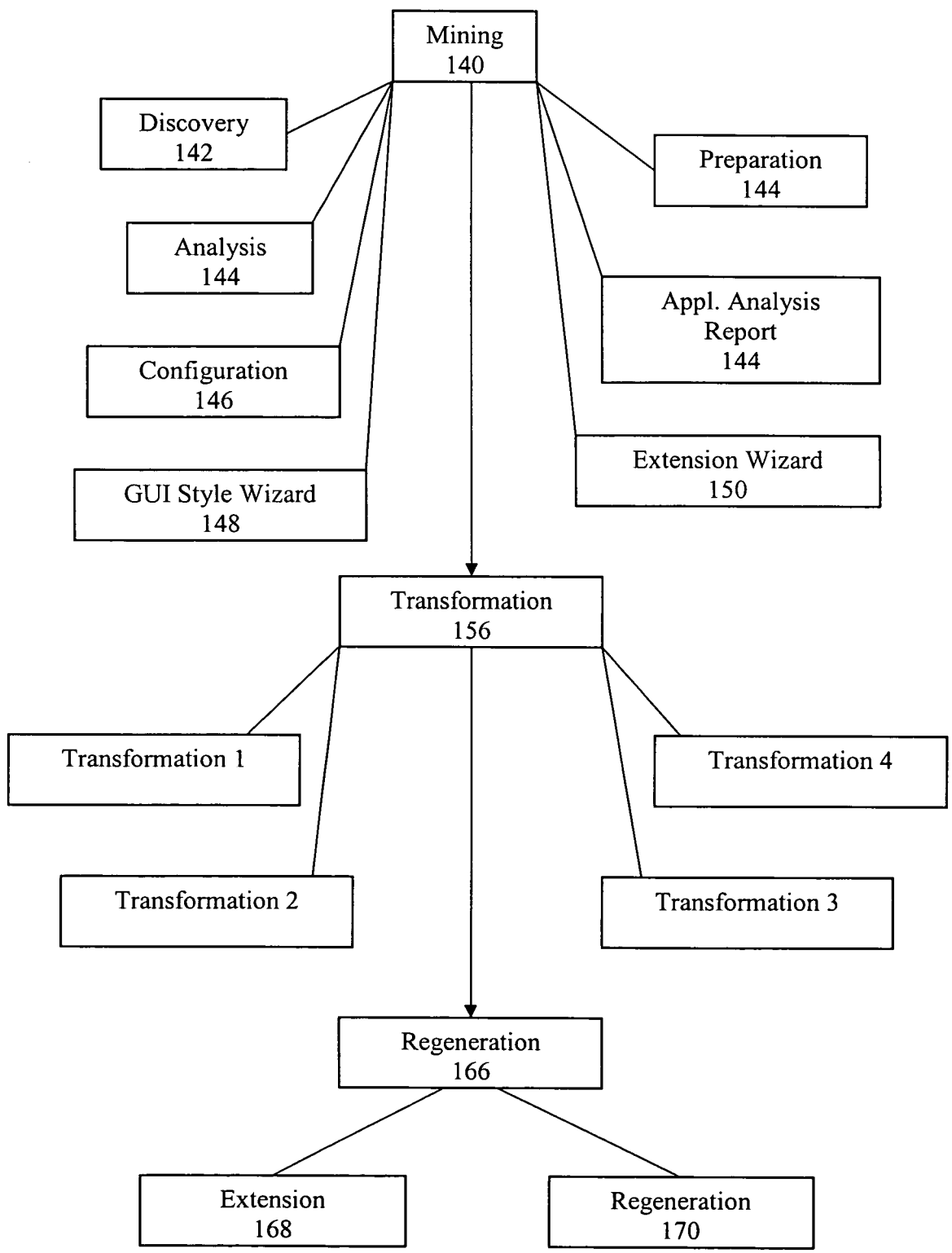
FIG. 2 shows a flow diagram for a method for transforming a procedural program having procedural language code into an object-oriented program, according to an exemplary embodiment.

FIG. 2 shows a flow diagram for a method for transforming a procedural program having procedural language code into an object-oriented program, according to an exemplary embodiment of the present disclosure. In the exemplary embodiment of FIG. 2, the transformation begins with a mining process 140 which may include discovery 142, analysis 144, configuration 146, GUI Style Wizard 148, Extension Wizard 150, Application Analysis Report 152, and Preparation 154 and other steps for collecting resources from the legacy software application and preparing them for transformation. Once stored in the meta-format, the meta-components may be operated upon by a transformation process 156 which can include transformation 1 subprocess 158 through transformation 4 subprocess 164, where the meta-components may be processed, reorganized and enhanced. During this transformation process, the legacy meta-components are transformed into object meta-components. Finally, during a regeneration process 166, in an extension subprocess 168, libraries are built based on results from the mining process 140, and in a regeneration subprocess 170, the object meta-components are implemented as actual object classes in a specific, object-oriented language.

Separating the transformation system of the present disclosure into multiple subprocesses as described above provides several additional features of the present disclosure. A first feature is the creation of a "from anywhere/to anywhere" transformation. This is because the makeup of the meta-components may be defined by the transformation system. For example, in order to transform a particular legacy software application, a mining process 140 capable of storing the legacy components as meta-components in the repository may be provided. In order to transform a legacy language software application into a particular object language, a transformation process 156 and a regeneration process 166 capable of creating object classes in the desired object language from the object meta-components may also be provided. A second feature is that additional new steps may be added to the processes of the transformation system when it is desired to alter the outcome of the transformation.

For instance, in order to customize a particular transformation methodology it is possible to add customization steps to processes. These customization steps are able to perform changes to any or all of the components before or after one of the other steps in the transformation system is performed. Such customization steps can be used to add to, delete from or alter a component. For example, it may be desirable to remove a particular field from one or more forms, add a different field or other resource (such as an icon) to the corresponding GUI and then make a change to the related object code. There are many other features that are possible because of this infrastructure.

Another aspect of the method according to the present disclosure is that it may be made restartable from any step or process and any component within the legacy software application. If, for instance, a power failure occurs during any part of the processing, the transformation system and method may be restarted from the step and component that was being processed when the power failure occurred. To achieve this feature it may be desirable that the repository selected be a persistent storage facility (e.g., a database repository).

An exemplary embodiment of the mining, transformation and regeneration processes is described in more detail below.

The mining process 140 discovers resources for a transformation, stores them in the repository and prepares them and any other meta-component for the transformation. Preferably, the mining process 140 has the ability to report any deficiencies found in the legacy software application that may prevent a complete transformation. These deficiencies are most commonly missing components such as a source code or form definitions. The mining process 140 may also provides for operator input which may be used when the mining process 140 encounters capabilities of the legacy development environment for which there is either no known transformation or for which the transformation system has not yet been programmed to handle. This provides the opportunity for the operator to correct any deficiencies in or to enhance the transformation system before the remainder of the processes are run.

The following exemplary steps may be performed by the mining process 140. Each step described may or may not be utilized for a particular transformation methodology. Further, each transformation methodology can be provided with a set of configuration values which alter the output generated by the process. For instance, a specific configuration value may cause the resulting components to be renamed based on a specific pattern. Each configuration value may have a default setting which can be overridden by the operator.

The discovery step 142 queries the legacy software development environment and develops a catalog of components contained in a particular application. The discovery step may scan appropriate logical memory, for example, physical memory blocks and virtual memory pages, according to the operating system present on the computer scanned. The components scanned may include, but are not limited to, the source code, form definition, application structure, the schema of any related database, forms, frames, procedures, record definitions, global variables, constants, host routines, etc. These components are preferably stored as meta-components in the repository. In addition, for source code components, the source code may be tokenized or broken down into a stream of basic programming symbols. Copies of these components are then stored as meta-components in a repository where they may be retrieved, modified and saved repeatedly. This repository may be a memory cache, a file system, a database or any other suitable information storage facility.

In the analysis step 144, all of the information of a meta-component is analyzed and a map is created for each component. The map contains information on where each routine and section within a routine starts and stops within the token stream. In addition, metrics concerning each component may be used to create an Application Analysis Report 152.

During the validation phase, a cross-reference of all components in the legacy application is generated. This cross-reference provides a list of every component (module, data source, form, etc.) that is referenced by a component. Then, the repository is checked to ensure that all of the components of the legacy environment have been stored in the repository. If any components are found to be missing, the operator is notified to allow the deficiency to be addressed. The process can continue with unreferenced components but the components which reference them are not completely transformed.

During the configuration step 146, the information from the analysis step 144 is used to establish the initial configuration. This configuration is stored in the meta-component which describes the legacy application itself. This meta-component controls the transformation process 156. Some of these parameters may be modified during the validation phase.

The GUI Style Wizard 148 provides an operator with the ability to customize the resulting graphical user interface by overriding its default specifications. The wizard creates a custom menu bar, toolbar and button bar definitions are applied to all graphical forms to provide a consistent look and feel in the resulting application.

The Extension Wizard 150 provides the operator with an opportunity to direct the transformation process 156 to create a new foundation class library, business object library and front-end library for the application. These new object libraries are built on the schema specifications found in the legacy software application and can radically reduce the time for developing new features and functions in the new application. If this step is not run, the transformation does not create these libraries.

Preferably the application analysis report 152 is a comprehensive report on the entire legacy infrastructure, and includes a cross-reference of all resources and detailed information and metrics on each component. It may also provide a listing of problem areas as described above. The metrics include: the kind and total number of components in the legacy application, total lines of source code, the number and definition of routines that make up each module, a compilation of all commands presented by the application, etc.

During the preparation step 154, all additional target OO meta-components which are to be used for the transformation are created in the repository. If the meta-components exist in the repository from a prior run of the transformation process, they are destroyed and new meta-components are created.

The transformation process 156 provides a mechanism by which the legacy meta-components now stored in the repository are manipulated to create the object meta-components. The transformation process 156 performs a transformation in which the entire legacy application may be transformed in a multi-stage, parallel process. In the transformation process 156, any particular source statement (in the instance of code), or form part, or any other portion of a component of the legacy software application can potentially trigger a rule which causes one or more components (or procedures) to be modified in some way. For instance, during the transformation of a frame (for example, a procedure which includes a user interface and has an associated form), the transformation process 156 may discover a parameter. That parameter becomes an attribute of the object class being created to replace the frame. Processing of the frame is suspended, the object class is retrieved from the repository, the attribute is added to the object class, the object class is returned to the repository and processing of the source is resumed. Likewise, in the processing of the frame's form definition, if a field is encountered on the form, an attribute is added to the same object class in a like manner. There are many other more complex transactions in the process which may move entire blocks of code from one component (or procedure) to another depending on the conditions.

In order to facilitate parallel processing (discussed above), a temporary storage facility having the capability to manage intermediate representations of components from the legacy software application, the new application and an intermediate application (or "meta-application") can be provided. The meta-application is convenient because rather than being tied to a specific implementation of any particular software development environment, it contains constructs which are found in any of these environments. By manipulating meta-components, the process of transforming the legacy software application into the new application can be separated into three distinct processes: mining, transformation and regeneration.

An exemplary embodiment of the transformation process 156 including four transformation subprocesses will be described below.

The transformation 1 engine 158 disassembles the legacy source code and organizes it into a structured format that can be easily manipulated. The source code for the components is disassembled using the maps created during the analysis step as a guide. Each parameter and variable declaration and each source statement is decomposed, organized and translated into an internal format. This can be accomplished in a number of ways. One way is to decompose the legacy source code for a component into a property tree data structure. A property tree is a hierarchical structure that provides for the storage of an unlimited number of identifiers or properties at any node in the tree. This decomposition is accomplished through several steps.

Figure 3:
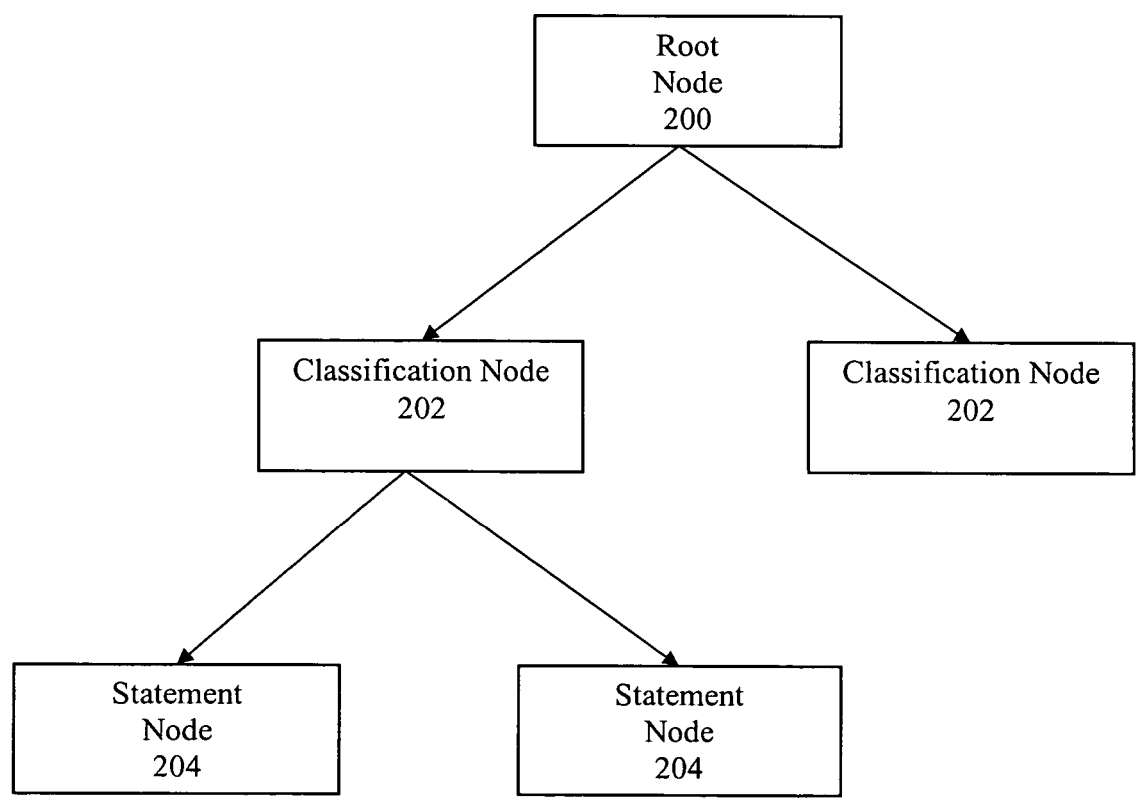
FIG. 3 shows a grammar tree for a legacy language statement.

The first step is to develop a grammar representation of the legacy programming language in the form of a hierarchical property tree. Prior to transformation, a legacy programming language grammar, an example of which is shown in FIG. 3, is created which represents the characteristics of the legacy programming language. Each different type of statement the legacy language supports is identified in the legacy language (e.g., FOR-ENDFOR, CALL, PROMPT, etc.). The statements are grouped into a hierarchy by grouping statements of a common type. For instance, FOR-ENDFOR and WHLE-ENDWHILE are considered loop controls. A single root node 200 is created for the property tree. At the root node 200, properties are created in the tree which are common to all statements. For instance, Line Number may be a property common to all statements. Below the root node, classification nodes 202 are created in the tree which represent the hierarchy developed for the statements above. At each classification node 202, properties are implemented which are common to those statements. For instance, Loop Counter might be a common attribute of all loop controls. Finally, statement nodes 204 are created in the appropriate classification node 202 that represent each specific statement. Properties are created for that node which are unique to the statement. In this method, at least one common property can be defined at each statement node 204 with a default value that is unique to the statement: the statement type.

Figure 4:
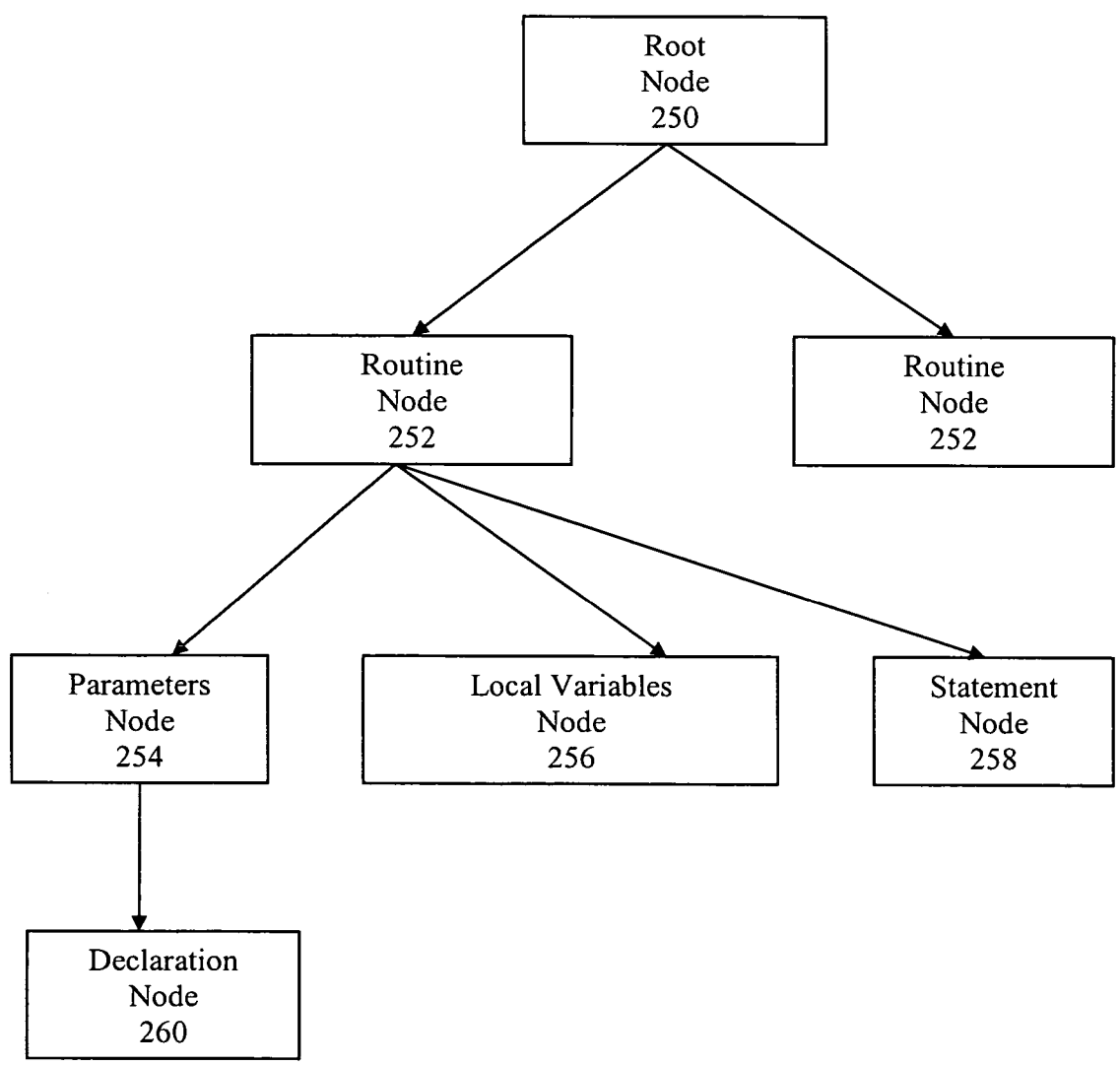
FIG. 4 shows an abstract syntax tree, according to an embodiment of the present disclosure.

During transformation 1 158, another type of tree, known as an abstract syntax tree, is developed for each component. An abstract syntax tree is a specialized version of a hierarchical property tree designed to contain fully decomposed source code. An example of an abstract syntax tree is shown in FIG. 4A root node 250 is created and properties are defined at the root node 250 which identify the component as a whole. Routine nodes 252 are created for each block of code that exists within the component. Classification nodes (not shown) which hold different types of code blocks can be created if this offers an advantage to the regeneration process 166 (discussed later in this document). Each routine node 252 has defined parameters which identify the routine. Section nodes 254, 256, and 258 are created below the routine node 252 and identify the different sections of the routine. The following three section types are typical: parameters node 254, local variables node 256 and statements node 258.

The transformation 1 158 also uses the map created during the analysis step 144 of the mining process 140. The map contains information on where each routine and section within a routine starts and stops within the token stream. Beginning at the first token for the parameter section of the code, transformation 1 158 processes tokens until it finds a complete declaration statement. It then adds a declaration node 260 to the parameter section node 254. At that node, it defines properties which completely define the variable which is being declared as a parameter. This is repeated for the local variable and statement section. Once transformation 1 158 identifies the statement type, it locates the node in the legacy language grammar tree shown in FIG. 3 which represents that statement. It traverses up the tree copying all of the properties which define the statement or are a property of any classification node up to and including the root node. Those properties are then defined in the statement node of the components property tree. Transformation 1 158 then parses the statement and replaces the default values of each property with the exact values found in the statement.

Figure 6:
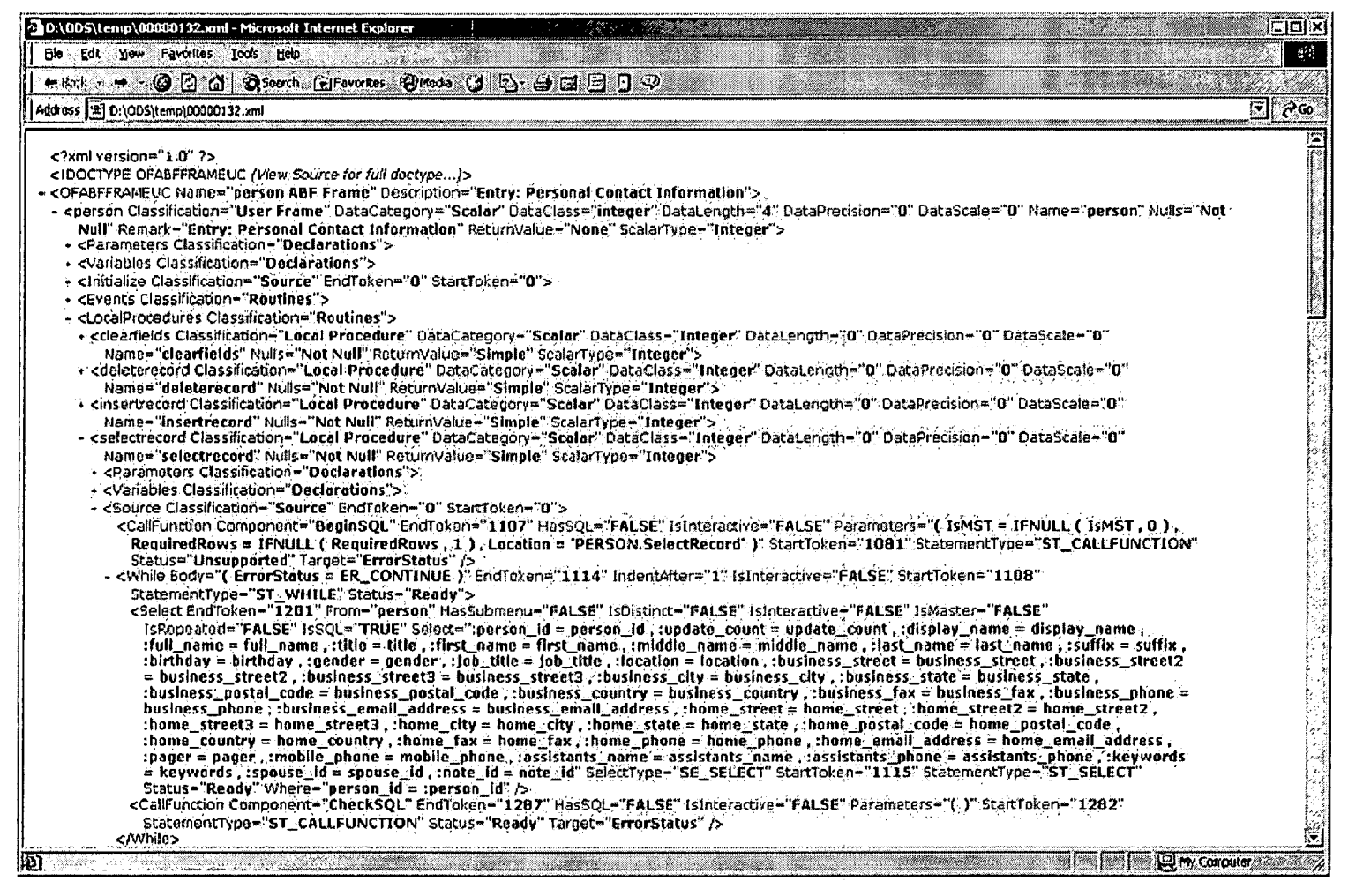

In addition, transformation 1 158 maintains relationships between statements. For instance, any statement found after a FOR statement and before the corresponding ENDFOR can be created as a child node of the FOR statement node. This nesting can continue as deep as needed. Nesting the code in this manner makes it easy to move entire code blocks later during the transformation. Once this process is completed, a complete, organized version of the legacy source code has been created and can now be acted upon. A sample visualization of an abstract syntax tree expressed as an XML document is shown in FIG. 6.

The transformation 2 engine 160 is responsible for converting the legacy forms into object meta-components which can be used to create a graphical interface during regeneration. This can be accomplished in a manner similar to the way the legacy source code was manipulated in transformation 1 158. This process, uses two reference property trees, a Graphical Interface Form Template tree, and an OO class hierarchy tree.

The Graphical Interface Form Template tree contains a representation of an empty graphical interface form. The root node for this form contains a description of the basic characteristics of the form. The property tree can comprise three root nodes. The first root node can contain the properties which describes the window. A window is an area for displaying information on a graphical user interface. The second root node contains a placeholder for the menu bar. A menu bar is a special area usually placed at the top of a window which allows the user to select from a series of commands. The third root node contains child nodes which describe the contents of the window itself. In order to create a more efficient process, a default configuration for the window contents can be supplied in the property tree. The OO class hierarchy tree describes the class hierarchy of the target object oriented software development environment. This property tree is created substantially similar to the Legacy Language Grammar Tree. Every OO model software development environment has a system or built-class hierarchy. This class hierarchy defines the foundation class objects which make up the development environment. The OO class hierarchy tree is created by implementing a property tree which describes each attribute of each class in the hierarchy.

Figure 5:
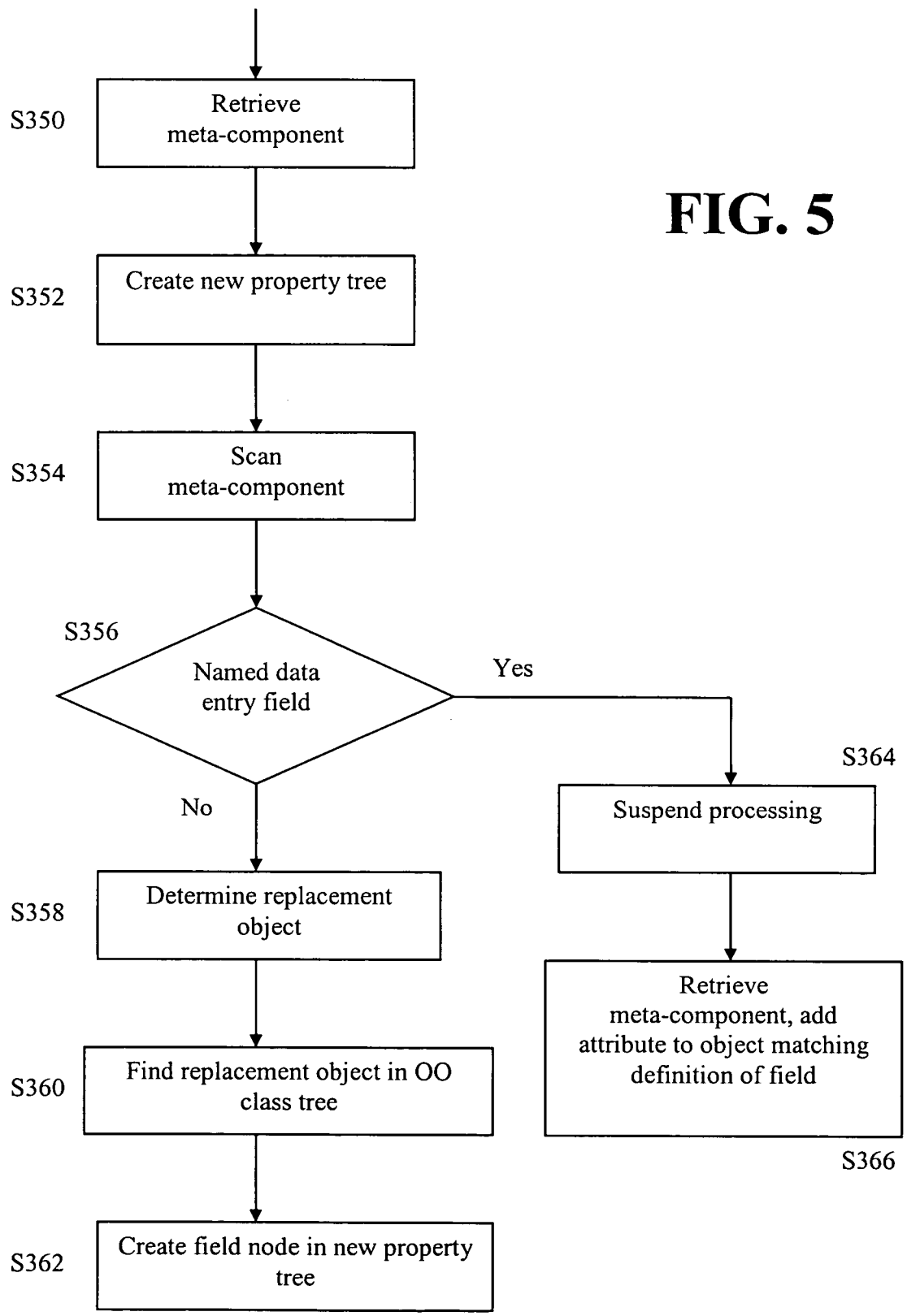
FIG. 5 shows a flow chart of a process for converting legacy forms into object meta-components which can be used to create a graphical interface, according to an embodiment of the present disclosure.

Referring to FIG. 5, transformation 2 160 retrieves a metacomponent from the repository representing a legacy form (Step S350). A new property tree is created which represents the graphical interface form replacement for the legacy form (Step S352). This is accomplished by first copying the Graphical Interface Form Template. Transformation 2 160 scans the meta-component (Step S354) and, if the code scanned is not a named data entry field (No, Step S356), then, for each item on the legacy character form (field, trim, etc.), transformation 2 160 decides what replacement object is to be placed on the graphical form (Step S358). Once this decision is made, the process can look up the object class in the OO class hierarchy tree and collect all its properties by traversing the tree all the way up to the root node and collecting properties along the way (Step S360). Then, a field node is created in the form section of the abstract syntax tree and the copied properties are defined at that node with the default values replaced by those read from the legacy form (Step S362). Once all items on the legacy form have been processed, what remains is a complete description of a graphical interface.

Two other processes my be implemented during the creation of the graphical interface. First, when a named data entry field is encountered on the legacy form (Yes, Step S356), processing of the form is suspended (Step S364) while the meta component for the object class which is to replace the source code associated with the form is retrieved and an attribute is added to the object which matches the definition of the field (Step S366). This is done because in many legacy software development environments, fields on forms are implicitly declared variables in the form's source code. In the OO model, they became declared attributes of the object.

Second, after processing the legacy form, the process scans the abstract syntax tree created in transformation 1 158 for the form's source code. Specifically, the process looks for user commands found in the legacy source. If any are found, any one of several GUI controls (buttons, toolbar icons, or menubar commands) may be created on the graphical user interface property tree based on input from a GUI Style Wizard. Then, one or more events are added to the abstract syntax tree that represents the new code logic for the form. These added events associate the new GUI form controls with the method that was generated in the object class that is the transformed representation of the logic associated with the menu command in the legacy application.

In transformation 3 162, the abstract syntax tree for each legacy source code component is retrieved from the repository. The corresponding object meta component is retrieved as well. For every routine node in the abstract syntax tree, a method node is created in the object meta component. A method is the source code in an object that can act upon the object. Transformation 3 162 first takes any parameters of the routine and declares them as parameters of the method.

The same is done with local variables. The statements are then processed. For each legacy statement type, transformation 3 162 decides how to convert the statement and where to put it. In many instances, the engine may decide to completely move an entire routine or subset of a routine to a completely different object. This happens when a feature of the legacy software development language is not easily translated into the new software development environment.

Another part of transformation 3 162 is transforming the procedural context of the legacy software application into an object context. This has two aspects. First, in a procedural environment, one component invokes another by calling it. In the OO model, rather than calling a procedure, an instance (or copy) of an object is created and one of its methods is invoked. Whenever transformation 3 162 encounters some kind of legacy call statement, it suspends processing, retrieves the object meta component which defines the called object, and validates the parameters to the call. In some instances the object may require adjustments. Then, in the calling component, the call statement is replaced with several different statements. The first statement is to an Object Request Broker (ORB). An ORB is a special object whose job is to manage the creation of other objects based on a request. The next statement added is a call to a special method common to all transformed components which invokes or starts the objects processing.

The second aspect of the transformation from a procedure to an object context is the syntactical difference between a procedural software development tool and a OO software development tool. During the processing of the statements, each token is checked to see if it is a reference to what has been transformed into an attribute of the class. If so, the appropriate changes are made to the source so the appropriate variable is referenced.

Transformation 4 164 is the transformation in this exemplary embodiment. It involves the cleanup of a variety of small problems which can remain but may not be dealt with in parallel to all of the processing which is performed in transformation 3 162.

The regeneration process 166 is the reverse of the mining process 140. During the regeneration process 166, the object meta-components created during the transformation process 156 are used to create the actual object classes that are placed in the new software development environment. In addition, the new graphical interface forms and any other components that may be needed are created and placed in the new software development environment.

The extension step 168 builds the new Foundation Class Library, Business Object Library and Front-End Component library as specified by the Extension Wizard run during the mining process 140.

In regeneration step 170, actual object classes and GUI forms are generated from the object meta-components according to the specifications contained therein.

The tools of this application may be applied to transform a legacy, character-interface, procedural host-based (1-tier) application into a modem, graphical, object-oriented client-server (2-tier) application.

Figure 8:
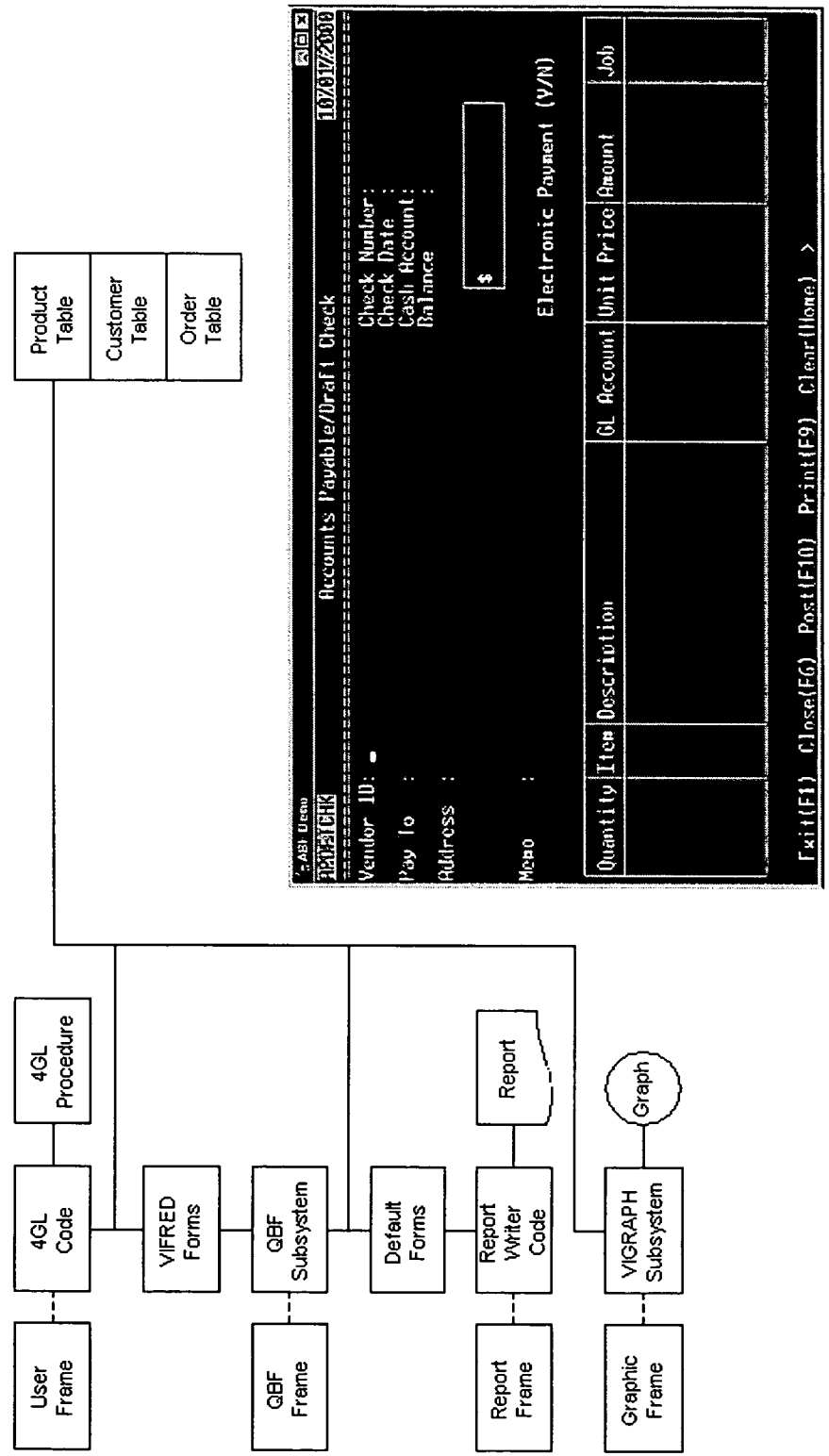
FIG. 8 shows a schematic representation of a host-based architecture and interface used by procedural, character-based applications.

As mentioned above, conventional approaches for converting legacy applications typically maintain the procedural structure of the code and the character-based format of the user interface. An example (INGRES ABF) of a host-based architecture and interface used by procedural, character-based applications is shown in FIG. 8. ABF (Applications By Forms) is an INGRES facility for creating database applications, generally through a hierarchy of menus, reports, applications, etc. ABF applications include assorted frames, such as user-specified frames, report frames and Query By Form (QBF) frames. QBF is an INGRES facility for interactive data entry. VIFRED is a visual forms editor facility for INGRES. VIGRAPH is an INGRES facility for building graphical interfaces.

Figure 9:
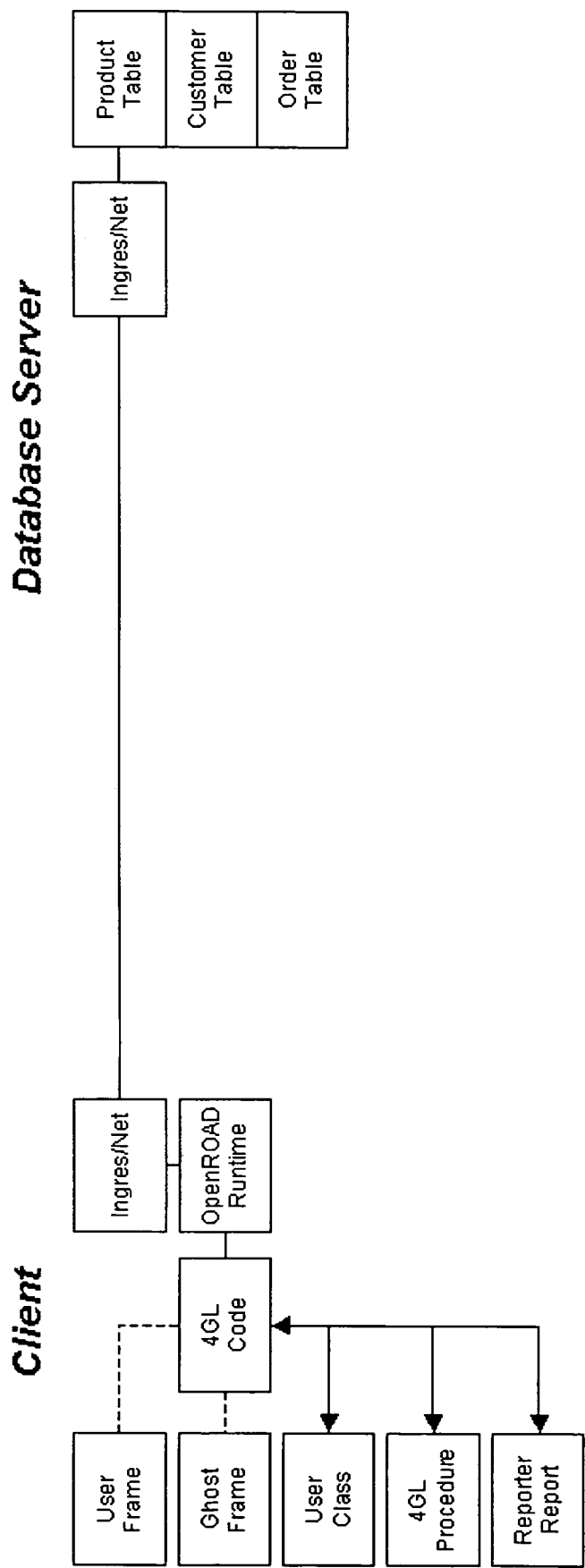
FIG. 9 shows a schematic representation of an object-oriented, intermediate client-server architecture, to which legacy applications may be transformed, according to an embodiment of the present disclosure.

The tools described herein allow a procedural application to be transformed into an object-oriented infrastructure, which may use a client-server architecture as shown, for example, in FIG. 9.

Figure 10:
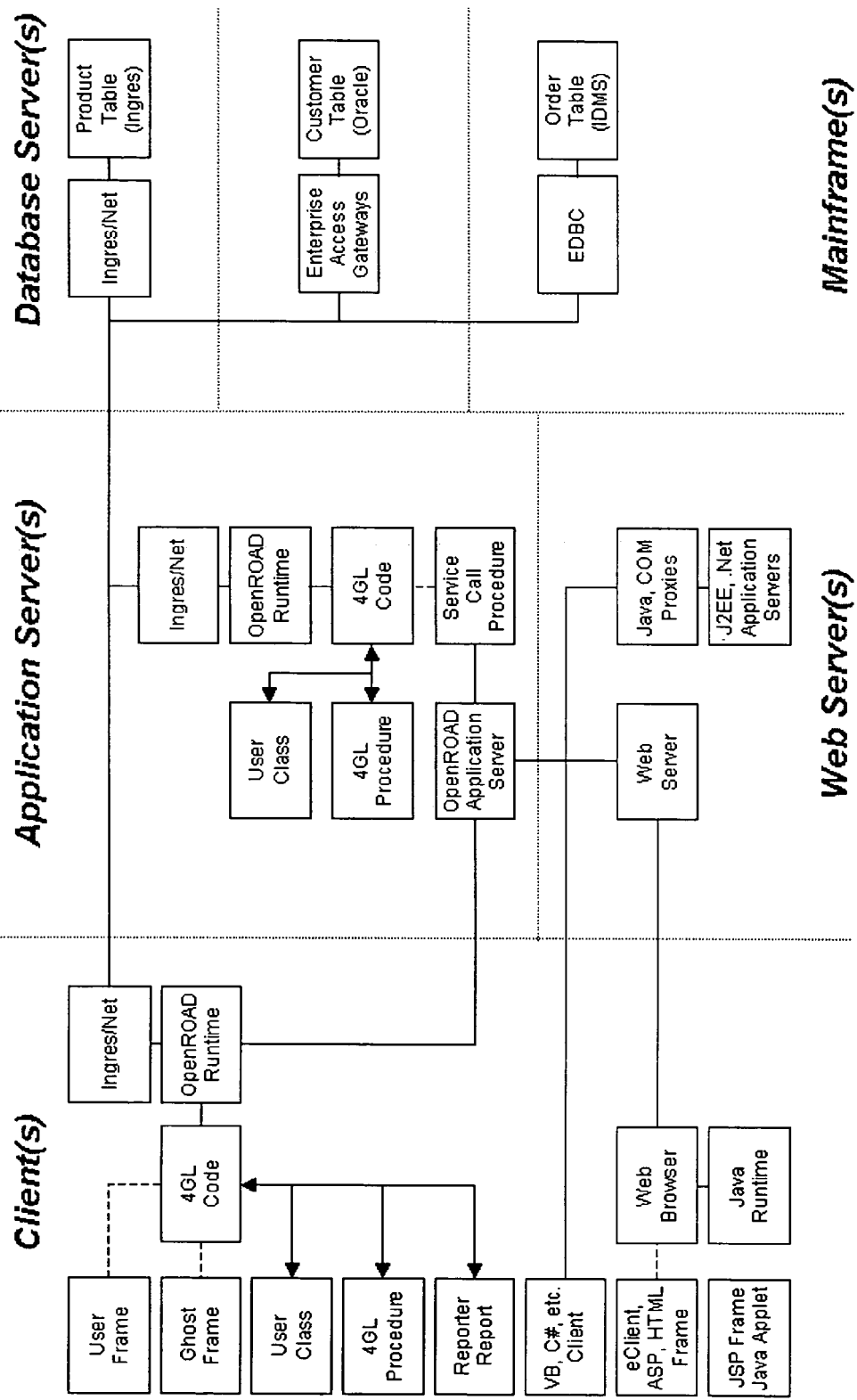
FIG. 10 shows a schematic representation of a multi-tier, heterogeneous architecture, according to an embodiment of the present disclosure.

An enhancement to the transformation process for automatically partitioning the transformed application into an N-tier application so that the application can be deployed on the web is discussed below. The enhancement, according to an exemplary embodiment, can use a multi-tier, heterogeneous architecture, such as shown exemplarily in FIG. 10. The N-tier application can include (i) a thin-client (containing just the user interface components) which talks to (ii) server-based components (containing the business logic components) which in turn communicate with (iii) a DBMS server The application source code may automatically be partitioned into user interface components and business logic components, to allow the application to be deployed as a thin client accessing centrally managed, server-side business logic. The server-side components can be evolved into web services. Thus, the tools with N-tier enhancement can be used to transform legacy applications into components that can subsequently be exposed as web services.

Figure 11:
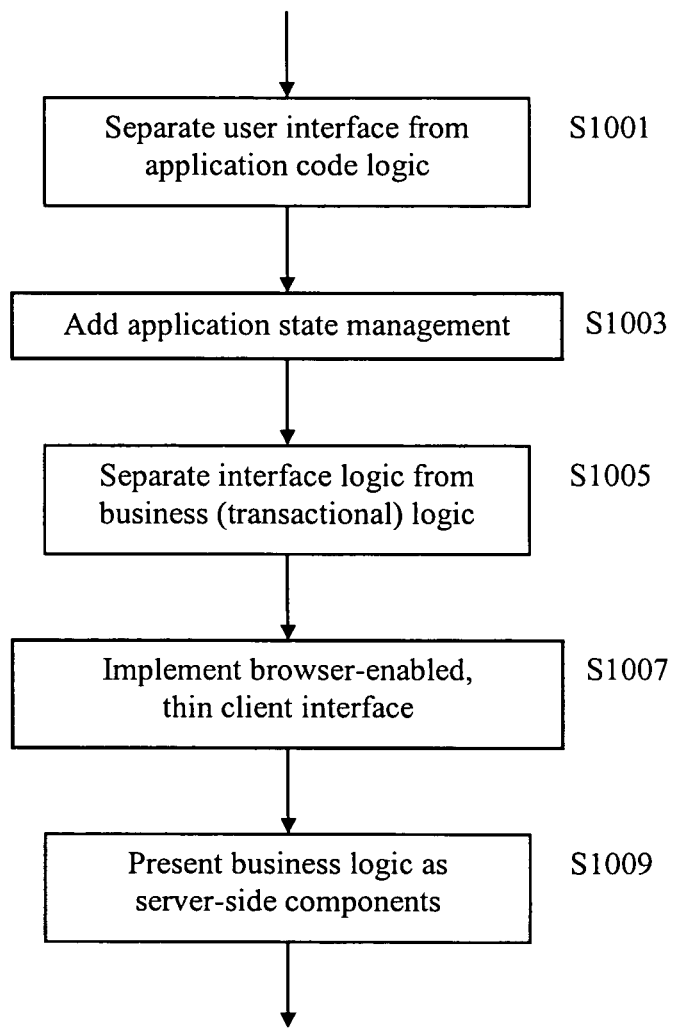
FIG. 11 shows a flow chart of a method for partitioning a transformed application into an N-tiered software system, according to an embodiment of the present disclosure.

A process for partitioning a transformed application and deploying it as an N-tier application may include, according to an exemplary embodiment (FIG. 11), performing the following: separation of user interface from application code logic (step S1001); addition of application state management (step S1003); separation of interface logic from business (transactional) logic (step S1005); implementation of a browser-enabled, thin client interface (step S1007); and exposure of business logic as server-side components, including web services (step S1009). The steps S1001 through S1009 does not need to be performed in the order listed, and can be performed in parallel.

The user interface and application code are often intertwined in legacy applications. Therefore, the partitioning of a legacy application into an N-tier application includes separation of user interface from application code. A tabular view of an example of frame transformation and conversion of code is shown in FIGS. 12A and 12B.

State is typically managed by global variables in legacy applications, including scalar (single value) and record type (multi-value) globals. The values can be transformed into like-kind components in the transformed application. A more intelligent process is defined by the refined methodology.

Not all global variables contain state information. There might simply be scratch variables or variables that contain cached information that is not changed. The methodology implements a sophisticated mechanism to ensure that only global variables that contain state information are included in the state management object that is implemented to allow scratch, cache and state globals to be treated uniquely and optimally.

State variables can be marshaled to with each call In order to support stateless application server processing. State management is controlled using a new state management object, preprocessor directives, macrovariables, and include scripts.

The following steps can be taken to create a State Management Object: (A) create a user class that manages state, including (i) declare attributes that correspond to all global variables that contain state information, (ii) remove these global variables from the application, (iii) declare a single global instance of this user class in the application, (iv) add the state management object as a BYREF parameter in application server calls, and (v) modify the SCPs to accept and restore state; and (B) modify the application to use the State Management Object rather than the original global variables, including (a) change all global variables in the source code to similarly named macrovariables (for example, "curuser" becomes "$curuser"), and (b) selectively modify the Global Include Script to point these macrovariables to the state object (for example, #define $curuser "AppState.CurUser").

In many legacy applications, user interface and business logic are extensively mingled within a frame or procedure. However, there may be reasonable separation of user interface and business logic within individual code blocks. Each of the code blocks is transformed into separate methods for the resulting application. By creating an infrastructure in which these methods can be essentially shifted at runtime to an application server, the application can be molded into running as a multi-tier application.

This methodology produces an efficient infrastructure for both developing and deploying applications. The runtime shifting can be a virtual shifting technique whereby the code to be shifted is actually removed from the client application before it is built and replaced with a remote procedure call (RPC). The business logic is then included in the component deployed to the application server. The client and application server components are built from the same source code base [a technique called remote method execution (RME)].

RME is a way of tagging individual methods to be run on the application server rather than on the client (or both). Any method that contains SQL or any host based operation can be RME enabled. Cover classes for 3GL routines that are not delivered with the client application (or contain embedded SQL) can be RME enabled.

RME is implemented using a series of preprocessor directives, macrovariables and include scripts. The basic application code structure is not changed and development of the application is still performed in client/server mode.

The following code block is an example of a build control script included in every application component. The script defines the macrovariables for controlling the remainder of the RME process:

```
#define $FatClient 0
#define $ThinClient 1
#define $Server 2
#define $BuildType $ThinClient
#if $BuildType = $FatClient then
#define $ClientLogic TRUE
#define $ServerLogic TRUE
#endif
#if $BuildType = $ThinClient then
#define $ClientLogic TRUE
#endif
#if $BuildType = $Server then
#define $ServerLogic TRUE
#endif
```

The value of the $BuildType macrovariable is set by hand to either $FatClient, $ThinClient or $Server depending on what kind of build is performed. An example of the RME code inserted into application components is provided below:

```
#include BuildControlScript
method GetEmployee( ) =
{
#ifdef $ServerLogic
  SELECT :CurObject.employee_id = employee_id,
    :CurObject.update_count = update_count,
    :CurObject.manager_id = manager_id
    :CurObject.government_id = government_id,
    :CurObject.hire_date = hire_date,
    :CurObject.salary = salary,
    :CurObject.bonus = bonus,
    :CurObject.hourly_rate = hourly_rate,
    :CurObject.review_date = review_date,
    :CurObject.review_notes = review_note,
    :CurObject.term_date = term_date,
    :CurObject.marital_status = marital_status
  FROM  employee
  WHERE employee_id = :CurObject.employee_id;
#else
#include ExecuteOnServerScript
#endif
}
```

In the above example, if the macrovariable $ServerLogic evaluates to TRUE (1), then the SQL statement is included in the application being built. Otherwise, an RPC call (contain in an include script called "ExecuteOnServer") is included as the only code in the method. This occurs when building the component for the thin client and the class essentially becomes a self-describing proxy for the real component on the server.

Building the client and server images out of the same source code base is a combination of using the above described macro variables and organizing the source code into separate but dependent applications. By using a prescribed build process which includes the correct macrovariable settings and applications, both the thin-client and application server components can be constructed. An example is shown schematically in FIG. 13.

The tools of this application provide a factorial reduction in the cost, time and risk of modernizing legacy applications when compared with either rewriting the applications or replacing them with off-the-shelf packages. However, the tools allow an enterprise to exploit the new application using web technology and allow components to be easily exposed for reuse in a J2EE or .Net environment. Therefore, an enterprise using the tools can quickly move from a legacy environment to a component-based architecture that provides a web browser interface for the original application and web services access to the underlying business objects.

Numerous additional modifications and variations of the present disclosure are possible in view of the above-discussed exemplary embodiments. Elements and/or features of different illustrative embodiments may be combined with and/or substituted for each other within the scope of this disclosure and the appended claims.

Additional variations may be apparent to one of ordinary skill in the art from reading the following applications, which are incorporated in their entireties herein by reference:

(a) U.S. Ser. No. 60/486,651, filed Jul. 11, 2003 and entitled "METHOD AND SYSTEM FOR TRANSFORMING LEGACY SOFTWARE APPLICATIONS INTO MODERN OBJECT-ORIENTED DISTRIBUTED SYSTEMS";

(b) U.S. Ser. No. 10/341,132, filed Jan. 13, 2003 and entitled "METHOD AND SYSTEM FOR TRANSFORMING LEGACY SOFTWARE APPLICATIONS INTO MODERN OBJECT-ORIENTED SYSTEMS";

(c) U.S. Ser. No. 10/142,462, filed May 10, 2002 and entitled "METHOD AND SYSTEM FOR TRANSFORMING LEGACY SOFTWARE APPLICATIONS INTO MODERN OBJECT-ORIENTED SYSTEMS"; and (d) U.S. Ser. No. 60/290,203, filed May 11, 2001 and entitled "METHOD AND SYSTEM FOR TRANSFORMING LEGACY SOFTWARE APPLICATIONS INTO MODERN OBJECT-ORIENTED SYSTEMS".

What is claimed is:

1. A method comprising:
transforming a procedural program using a processor into object-oriented, intermediate client-server code;
partitioning the object-oriented, intermediate client-server code into an N-tier application program;
transforming a first portion of the procedural program into a first portion of object-oriented, intermediate client-server code;
suspending transformation of a second portion of the procedural program when a predetermined segment of the second portion of the procedural program is detected; and
modifying the first portion of object-oriented, intermediate client-server code based on the predetermined segment.

2. The method of claim 1, wherein the N-tier application program includes a thin client and a plurality of server-based components.

3. The method of claim 2, wherein the thin client includes user interface components, and the server-based components include business logic components.

4. The method of claim 3, wherein the business logic components include web services.

5. The method of claim 2, wherein the server-based components include a DBMS server component.

6. The method of claim 1, wherein partitioning the intermediate client-server code into an N-tier application program includes separating user interface logic from application code logic.

7. The method of claim 1, wherein partitioning the intermediate client-server code into an N-tier application program includes adding application state management.

8. The method of claim 1, wherein partitioning the intermediate client-server code into an N-tier application program includes separating interface logic from transactional logic.

9. The method of claim 1, wherein partitioning the intermediate client-server code into an N-tier application program includes implementing a browser-enabled, thin client interface.

10. A computer system, comprising:
a processor; and
a program storage memory device readable by the computer system, tangibly embodying a program of instructions executable by the processor to perform the method claimed in claim 1.

11. A program storage memory device readable by a machine, tangibly embodying a program of instructions executable by the machine to perform the method claimed in claim 1.

12. Logic encoded in a tangible computer-readable memory comprising:
means for transforming a procedural program into object-oriented, intermediate client-server code;
means for partitioning the object-oriented, intermediate client-server code into an N-tier application program;
means for transforming a first portion of the procedural program into a first portion of object-oriented, intermediate client-server code;
means for suspending transformation of a second portion of the procedural program when a predetermined segment of the second portion of the procedural program is detected; and
means for modifying the first portion of object-oriented, intermediate client-server code based on the predetermined segment.

13. A method comprising:
transforming a procedural program into object-oriented, intermediate client-server code using a processor;
separating user interface from application code logic of a source procedural program;
adding application state management to a target distributed software system;
separating interface logic from business logic of the source procedural program;
implementing a browser-enabled, thin client interface for the target distributed software system;
presenting the business logic as server-side components for the target distributed software system;
transforming a first portion of the procedural program into a first portion of object-oriented, intermediate client-server code;
suspending transformation of a second portion of the procedural program when a predetermined segment of the second portion of the procedural program is detected; and
modifying the first portion of object-oriented, intermediate client-server code based on the predetermined segment.

14. A computer system, comprising:
a processor; and
a program storage memory device readable by the computer system, tangibly embodying a program of instructions executable by the processor to perform the method claimed in claim 13.

15. A program storage memory device readable by a machine, tangibly embodying a program of instructions executable by the machine to perform the method claimed in claim 13.

16. Logic encoded in a tangible computer-readable memory comprising:
means for transforming a procedural program into object-oriented, intermediate client-server code;
means for separating user interface from application code logic of a source procedural program;
means for adding application state management to a target distributed software system;
means for separating interface logic from business logic of the source procedural program;
means for implementing a browser-enabled, thin client interface for the target distributed software system;
means for presenting the business logic as server-side components for the target distributed software system;
means for transforming a first portion of the procedural program into a first portion of object-oriented, intermediate client-server code;
means for suspending transformation of a second portion of the procedural program when a predetermined segment of the second portion of the procedural program is detected; and
means for modifying the first portion of object-oriented, intermediate client-server code based on the predetermined segment.

17. A computer program product comprising:
a computer-readable storage memory having computer-readable program code embodied therewith, the computer-readable program code comprising:
computer readable program code configured to transform a procedural program using a processor into object-oriented, intermediate client-server code;
computer readable program code configured to partition the object-oriented, intermediate client-server code into an N-tier application program;
computer readable program code configured to transform a first portion of the procedural program into a first portion of object-oriented, intermediate client-server code;
computer readable program code configured to suspend transformation of a second portion of the procedural program when a predetermined segment of the second portion of the procedural program is detected; and
computer readable program code configured to modify the first portion of object-oriented, intermediate client-server code based on the predetermined segment.

18. The computer program product of claim 17, wherein the thin client includes user interface components, and the server-based components include business logic components.

19. The computer program product of claim 17, wherein the business logic components include web services.

20. The computer program product of claim 17, wherein the N-tier application program includes a thin client and a plurality of server-based components.

* * * * *